US008739305B2

(12) United States Patent
Cathro

(10) Patent No.: US 8,739,305 B2
(45) Date of Patent: May 27, 2014

(54) SECURE ACCESS TO ENCRYPTED INFORMATION

(75) Inventor: Ian A. Cathro, Dundee (GB)

(73) Assignee: NCR Corporation, Duluth, GA (US)

( * ) Notice: Subject to any disclaimer, the term of this patent is extended or adjusted under 35 U.S.C. 154(b) by 1298 days.

(21) Appl. No.: 12/215,867

(22) Filed: Jun. 30, 2008

(65) Prior Publication Data

US 2009/0327720 A1   Dec. 31, 2009

(51) Int. Cl.
*G06F 17/00* (2006.01)
*G06F 21/62* (2013.01)
*G06F 17/30* (2006.01)

(52) U.S. Cl.
CPC ............ *G06F 17/00* (2013.01); *G06F 21/6218* (2013.01); *G06F 17/30067* (2013.01)
USPC .............................. 726/29; 380/201; 713/164

(58) Field of Classification Search
CPC ....................................................... G06F 17/30
USPC ............................................................ 726/29
See application file for complete search history.

(56) References Cited

U.S. PATENT DOCUMENTS

| 5,623,546 | A * | 4/1997 | Hardy et al. | 713/193 |
| 6,302,326 | B1 * | 10/2001 | Symonds et al. | 235/379 |
| 6,672,505 | B1 * | 1/2004 | Steinmetz et al. | 235/379 |
| 6,676,018 | B1 * | 1/2004 | Trelawney et al. | 235/381 |
| 2003/0056095 | A1 * | 3/2003 | Elliott et al. | 713/164 |
| 2005/0066167 | A1 * | 3/2005 | Asano et al. | 713/165 |
| 2005/0086501 | A1 * | 4/2005 | Woo et al. | 713/189 |
| 2005/0169467 | A1 * | 8/2005 | Risan et al. | 380/201 |
| 2008/0034421 | A1 * | 2/2008 | Ahn et al. | 726/17 |
| 2009/0100520 | A1 * | 4/2009 | Reasor et al. | 726/23 |

OTHER PUBLICATIONS

Sherman S.M. Chow, Lucas C.K. Hui, S.M. Yiu, K.P. Chow, Richard W.C. Lui, A generic anti-spyware solution by access control list at kernel level, Journal of Systems and Software, vol. 75, Issues 1-2, Feb. 15, 2005, pp. 227-234, ISSN 0164-1212.*
J. Hughes, C. Feist, H. S, M. O'Keefe, and D. Corcoran. A universal access, smart-card-based secure file system. In Proc. of the Atlanta Linux Showcase, Oct. 1999.*
Zadok, E., Iyer, R., Joukov, N., Sivathanu, G., & Wright, C. P. (2006). On incremental file system development. ACM Transactions on Storage (TOS), 2(2), 161-196.*
MSDN, Microsoft Windows Dev Center, retrieved, May 6, 2013: http://msdn.microsoft.com/en-us/library/windows/hardware/gg462968.aspx.*

* cited by examiner

*Primary Examiner* — Carl Colin
*Assistant Examiner* — Syed Zaidi
(74) *Attorney, Agent, or Firm* — Peter H. Priest

(57) ABSTRACT

A method of using a mini filter driver to secure access to encrypted information stored on a removable storage device. The method comprises receiving a request to read information from the removable storage device. The mini filter driver ascertains if the request originated from an authorized client. The mini filter driver receives encrypted information read from the removable storage device, and decrypts the encrypted information in the event that the request originated from an authorized client. The decrypted information can then be conveyed to the authorized client. If the client is not authorized, then the mini filter driver does not decrypt the information.

20 Claims, 4 Drawing Sheets

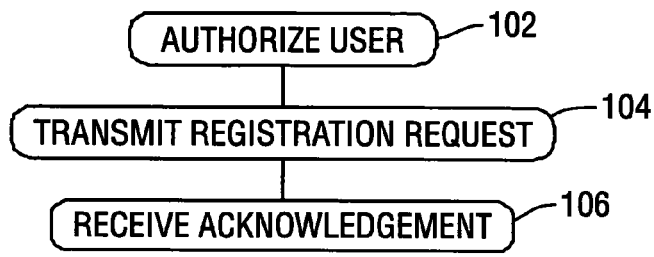
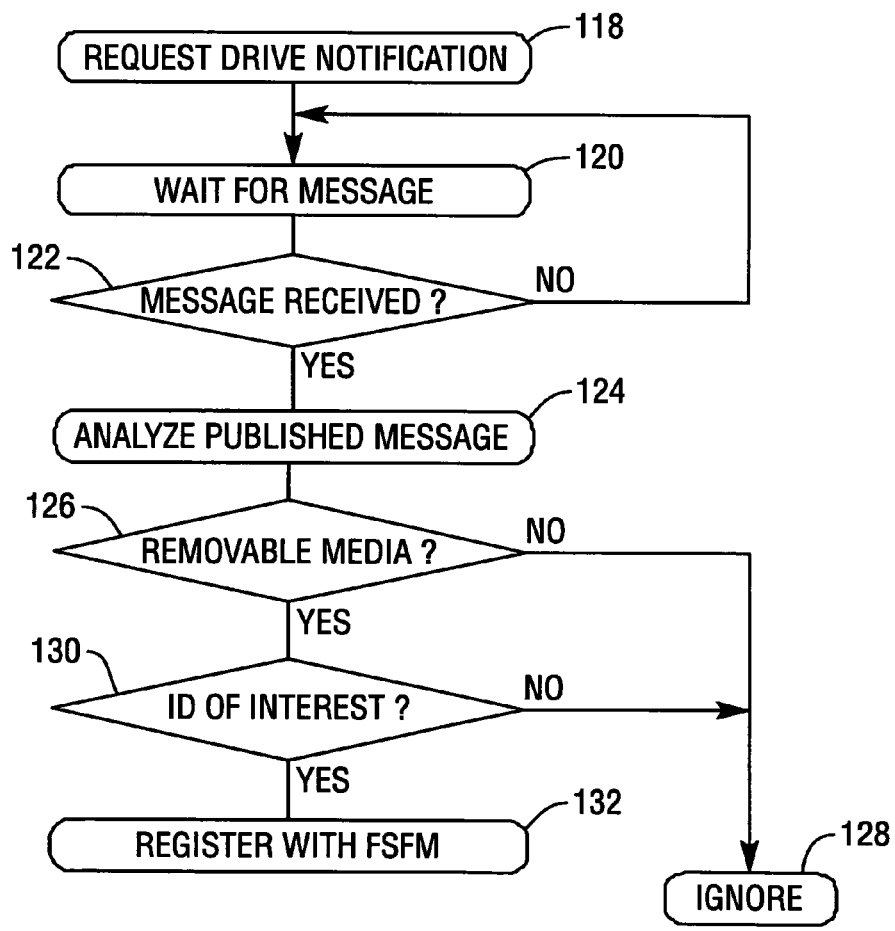

SECURE ACCESS TO ENCRYPTED INFORMATION

FIELD OF INVENTION

The present invention relates to secure access to encrypted information. In particular, though not exclusively, the invention has particular advantages for secure access to encrypted information on a removable storage device.

BACKGROUND OF INVENTION

In many fields, it is important to be able to provide secure access to encrypted information. This can be achieved by providing decryption facilities to decrypt the encrypted information. Although this works well for information stored on magnetic disk drives, and the like, it is not so useful for information stored on removable storage devices, such as CD-ROMs, DVDs, SD cards, and the like. This is because many file system encryption schemes do not support removable storage devices.

Decryption logic would normally be held on a terminal that reads removable storage devices. However, for removable storage devices this would mean that all files would require to have the same encryption technology as that required by the reading terminal. To support a different encryption technology would require a change at the reading terminal. This would require modification or replacement of the file system drivers, which is a time-consuming task.

Furthermore, many file system encryption schemes are user-specific, so they require a user to login to access the decrypted information. This may not be appropriate for terminals that are used by multiple individuals.

It would be advantageous to have a system for decrypting information stored on removable storage devices.

SUMMARY OF INVENTION

Accordingly, the invention generally provides methods, systems, apparatus, and software for decrypting encrypted information read from a storage device.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of using a mini filter driver to secure access to encrypted information stored on a removable storage device, the method comprising: receiving a request to read information from the removable storage device; ascertaining if the request originates from an authorized client; receiving encrypted information read from the removable storage device; decrypting the encrypted information in the event that the request originated from an authorized client; and conveying the decrypted information to the authorized client.

The request to read information from the removable storage device may be relayed via a file system filter manager with which the mini filter driver is registered.

Ascertaining if the request originates from an authorized client may further comprise: requiring a client to send a registration request to the mini filter driver prior to that client sending a request to read information from the removable storage device; validating the registration request; optionally sending an acknowledgement to that client; and creating an entry for that client in an authorized client list.

In some embodiments, only selected files may be encrypted on the removable storage device, in other embodiments, all of the files stored on the removable storage device may be encrypted. Whether all files or only selected files on a removable storage device are encrypted is transparent to the authorized client because the files are automatically decrypted by the mini filter driver. To the authorized client(s) all data it receives is in decrypted (or clear text) form.

As used herein, the term "file" includes programs, data, and any other information stored in a manner accessible by a computer system.

Although all storage devices are in some sense "removable", the term "removable" is used herein to designate only those storage devices that are intended to be portable and to be used on multiple computer systems. Such storage devices are usually very quick and easy to connect to and disconnect from a computer system. Thus, a magnetic disk drive is not "removable" as the term is used herein, but a CD-ROM, a DVD, a USB flash driver, and the like are "removable" as the term is used herein.

Decrypting the encrypted information in the event that the request originated from an authorized client may further comprise using decryption technology stored within the mini filter driver to decrypt the encrypted information. The decryption technology may comprise an algorithm and or decryption keys. Industry-standard or proprietary decryption technology may be used. The decryption technology selected may depend on whether the decryption must be performed in real time, or whether a delay in providing the decrypted information is acceptable. The advantage of using decryption technology stored in the mini filter driver itself is that it makes it more difficult for a third party to access the keys and/or the algorithm because they are stored in the operating system kernel.

Alternatively, decrypting the encrypted information in the event that the request originated from an authorized client may further comprise using decryption technology stored on the removable storage device to decrypt the encrypted information. The decryption technology may relate to keys stored in the same file as the information to be decrypted or on a different file to the information to be decrypted. Where decryption technology is stored on the removable storage device, the method may further comprise removing any portions of the encrypted information that contain the decryption technology prior to sending the encrypted information to an unauthorized client. This has the advantage that those portions of the encrypted information that include decryption technology are not transferred to an unauthorized client. An authorized client does not receive the decryption technology either, because they are used to decrypt the file and then discarded by the mini filter driver. Alternatively, the decryption technology may be interleaved with the information in a manner only known to the mini filter driver so that the decryption technology is not removed when the encrypted information is conveyed to an unauthorized client.

The method may comprise the further step of conveying the encrypted information to an unauthorized client in the event that the request originated therefrom. Thus, if the request does not originate from an authorized client, then the mini filter driver does not decrypt the file, but conveys the encrypted file to the unauthorized client. This enables an unauthorized client to read the file, but the contents of the file will be meaningless because they are encrypted.

The information may be read from the removable storage device by a file system driver. The file system driver may be a file system driver provided by a conventional operating system and implementing a conventional file system protocol (for example, FAT32, NTFS, or the like).

The method may further comprise identifying a removable storage device containing encrypted information. Identifying a removable storage device containing encrypted information may be implemented by comparing a volume label and/or identifier with one or more pre-stored volume labels and/or identifiers, and if a match is found then registering that volume label and/or identifier with a file system filter manager so that all read request (and optionally write requests, if available) are routed by the file system filter manager to the mini filter driver.

Each file stored in a removable storage device may include a block indicating if that file contains encrypted information. This may be useful where only some files on a removable storage device are encrypted, or where a different encryption is used on different files on a removable storage device.

According to a second aspect there is provided a computer memory storing in kernel mode the mini filter driver implementing the steps of the first aspect.

According to a third aspect there is provided a file management system comprising: a storage device driver for reading information from and writing information to a removable storage device; a file system driver in communication with the storage device driver for organizing files stored on the removable storage device; a file system filter manager in communication with the file system driver; and a mini filter driver registered with the file system filter manager, the mini filter driver further comprising a list of authorized clients and decryption technology, whereby the mini filter driver is operable to decrypt information read by the file system driver in response to a request from an authorized client.

The mini filter driver may further comprise a volume labels of interest list ("VLI list") storing volume labels of removable storage devices known to include encrypted information.

The mini filter driver may further comprise a client authentication component for receiving a code and an identifier from a client. The mini filter driver can use the code to validate that the client should be authorized, and can use the identifier to identify subsequent requests from the client.

According to a fourth aspect there is provided a self-service terminal including a plurality of devices requiring periodic maintenance, the terminal comprising: a management application for providing restricted functions accessible only by an authorized user; a port for receiving a removable storage device from a user, where the removable storage device contains encrypted information relating to maintaining the devices; and a file system filter manager including a mini filter driver for decrypting the encrypted information stored on a removable storage device in response to a request for the information from an authorized application; wherein the management application is operable to register with the mini filter to become an authorized application.

The mini filter can support a plurality of authorized and unauthorized applications. Information requested by authorized applications is decrypted "on-the-fly" by the mini filter; whereas, information requested by unauthorized applications may be conveyed by the mini filter as read (that is, in encrypted form), or only a portion of the information requested may be conveyed by the mini filter.

The self-service terminal may be an automated teller machine (ATM), an information kiosk, a financial services center, a bill payment kiosk, a lottery kiosk, a postal services machine, a check-in and/or check-out terminal such as those used in the hotel, car rental, gaming, healthcare, and airline industries, retail self-checkout terminals, vending machines, and the like.

The encrypted information may include descriptions, images, video, and lead-through for servicing the self-service terminal.

By virtue of this aspect, a management application executing in user mode is operable to receive information that has been decrypted by a mini filter executing in kernel mode.

According to a fifth aspect there is provided a file management system comprising: a storage device driver for reading information from and writing information to a storage device; a file system driver in communication with the storage device driver for organizing files stored on the storage device; a file system filter manager in communication with the file system driver; and a mini filter driver registered with the file system filter manager, the mini filter driver further comprising a list of authorized clients and decryption technology, whereby the mini filter driver is operable to decrypt information read by the file system driver in response to a request from an authorized client.

By virtue of this aspect of the invention, the file management system can be used with files stored on a "non-removable" (as the term is used herein) storage device, such as a disk drive, or an array of disk drives.

It should now be appreciated that a decryption technique may be provided at the kernel mode (rather than the user mode). This has the advantage that any type of removable media can be used with encrypted information because the mini filter is not specific to any particular type of removable media (for example, the same mini filter can be used with CD-ROM, DVD, SD card, Memory Stick, or the like).

One advantage of a using a mini filter driver is that it can register (and therefore intercept access to) only those removable storage device volumes that it is interested in. This does not introduce any compromise in performance on accessing files on other media, such as a disk drive, or on removable storage devices that the mini filter is not interested in (that is, those removable storage devices that are not registered).

It is very difficult for a third party to access this decryption technology because the decryption technology may be provided in the mini filter itself. Since the file system drivers are not involved in encryption or decryption, industry-standard file system drivers can be used (for example, FAT32, NTFS, or the like). Any application that reads from the removable storage device is not aware of whether the information is encrypted or not. If the application is authorized then it will automatically received decrypted (that is, clear text) information. If the application is not authorized then it will either not be able to read the information or the information will be meaningless (the encrypted information). These aspects do not place any specific requirements on the hardware used for the removable storage device, and enable the encrypted contents of the removable storage device to be copied from one device to another.

The mini filter driver may enable caching so that lengthy decryption of data does not necessarily occur each time an encrypted file is read.

These and other aspects will be apparent from the following specific description, given by way of example, with reference to the accompanying drawings.

BRIEF DESCRIPTION OF THE DRAWINGS

FIG. 3 is a flowchart illustrating steps involved in registering a client (a system application) with the custom mini filter driver of FIG. 1;

FIG. 4 is a flowchart illustrating steps involved in registering the custom mini filter driver with the file system filter manager.

DETAILED DESCRIPTION

Figure 1:
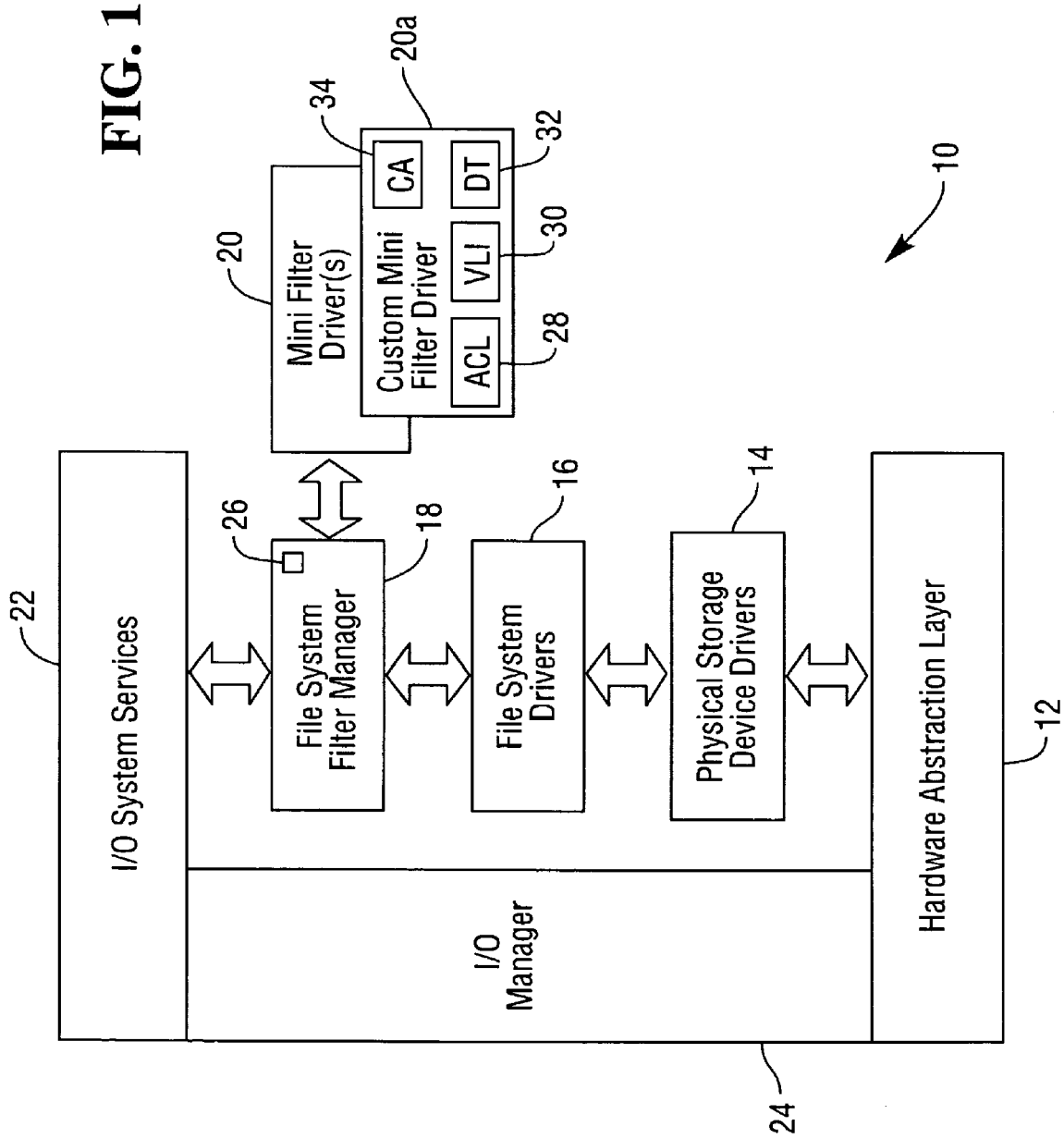
FIG. 1 is a block diagram of a file system for implementing a method according to one embodiment of the present invention using a custom mini filter driver and a file system filter manager.

Reference is first made to FIG. 1, which is a block diagram of a file system 10 for implementing a method according to one embodiment of the present invention. In this embodiment, the file system 10 is based on a Microsoft (trade mark) Windows (trade mark) operating system, such as Windows NT (trade mark), Windows XP (trade mark), or Windows Vista (trade mark).

The file system 10 comprises a hardware abstraction layer 12, one or more physical storage device drivers 14, one or more file system drivers 16, a file system filter manager 18, one or more mini filter drivers 20, a plurality of input/output system services 22, and an input/output manager 24.

The physical storage device drivers 14 are conventional drivers that interface with computer hardware (such as a processor, memory, a disk drive, and ports for removable storage devices, as will be described in more detail with reference to FIG. 2) and provide low level commands to instruct the computer hardware to perform tasks, such as reading information from a storage device, writing information to a storage device, reading properties of files from a storage device, and the like.

The file system drivers 16 and file system filter manager 18 are also conventional components that are shipped with a typical Windows operating system (such as Windows Vista).

As is known in the art, the file system filter manager 18 supports a plurality of mini filter drivers 20 that can be used to add functionality to the file system 10.

In this embodiment, in addition to any mini filter drivers 20 that may be shipped with a Windows operating system, a custom mini filter driver 20a has been created to implement decryption of encrypted information stored on a removable storage device, as will be described in more detail below. Creating a custom mini filter driver typically involves liaising with the operating system creator (such as Microsoft Corporation (trade mark)) to obtain an "altitude" at which the custom mini filter driver operates within the file system filter manager 18.

As is known in the art, the input/output system services 22 enable the operating system and applications to send requests for input/output services. For example, the I/O system services 22 may receive a read request from a word processing application to read a file from a hard drive, and the I/O system services 22 communicates with the file system filter manager 18 to fulfill that request.

As is also known in the art, the input/output manager 24 collects information from various devices and exposes this information to the operating system and to user clients.

The file system filter manager 18 includes an FSFM registry 26 for storing information on volumes associated (registered) with the custom mini filter driver 20a, as will be described in more detail below.

The custom mini filter driver 20a includes an approved client list 28, which stores identifiers of client programs that are authorized by the custom mini filter driver 20a. The custom mini filter driver 20a also maintains a volume labels of interest list 30 (the "VLI list") storing volume labels of removable storage devices known to include encrypted information.

The custom mini filter driver 20a includes decryption technology 32, in the form of a decryption algorithm and one or more cryptographic keys.

The custom mini filter driver 20a includes a client authentication component 34 for receiving and approving client authentication requests.

The operation of these lists 28,30 the decryption technology 32, and the client authentication component 34 will be described in more detail below.

Figure 2:
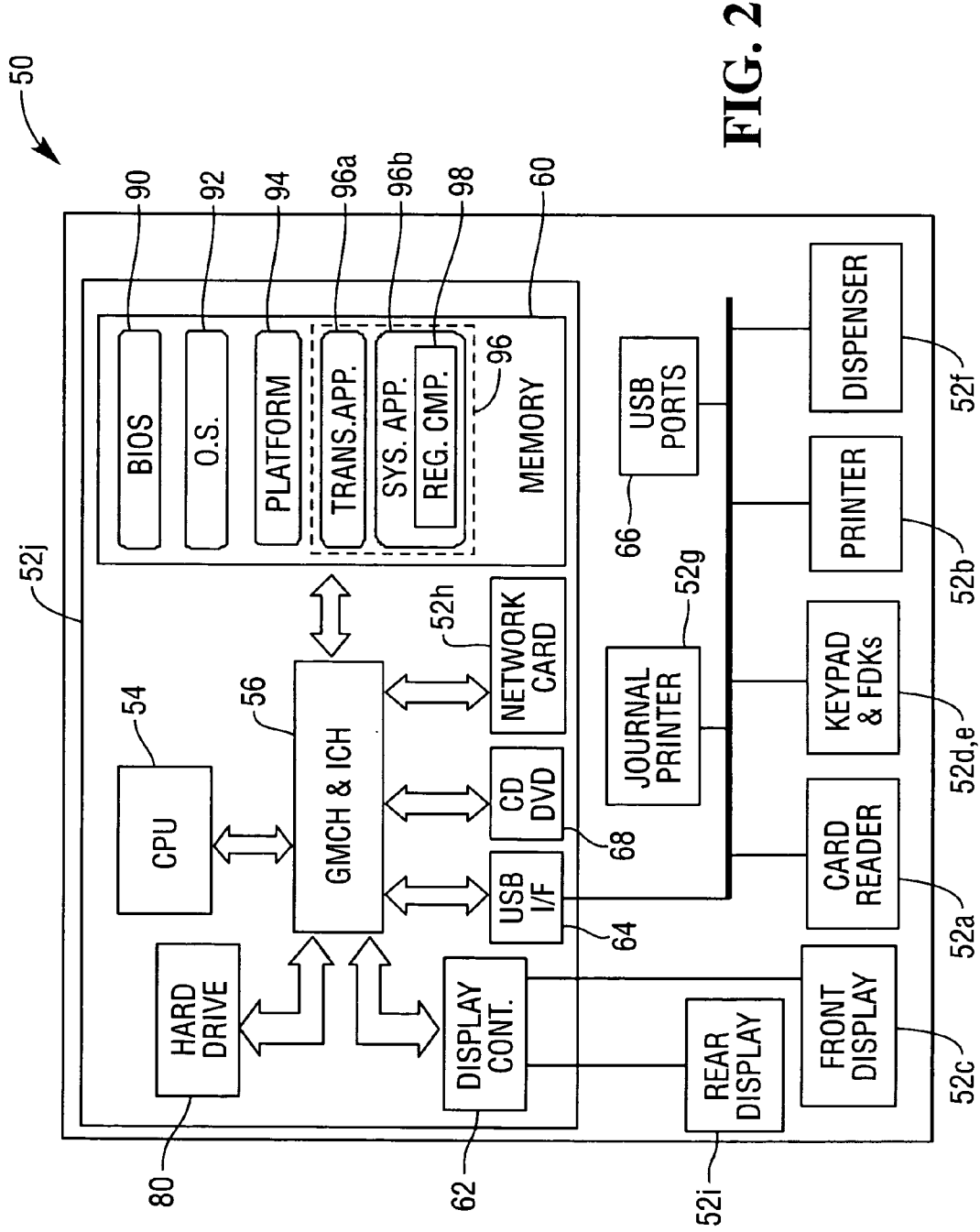
FIG. 2 is a schematic diagram of a self-service terminal (in the form of an automated teller machine) including the file system of FIG. 1.

Reference will now be made to FIG. 2, which is a schematic diagram of a self-service terminal 50, in the form of an automated teller machine (ATM), including the file system 10.

The ATM 50 comprises a plurality of internal devices 52 mounted within the ATM 50, including: a card reader device 52a; a receipt printer device 52b; a (front) customer display 52c and associated function display keys (FDKs) 52d disposed as two columns, each on opposing narrow sides of the customer display 52c; an encrypting keypad device 52e; a dispenser device 52f; a journal printer device 52g for creating a record of every transaction executed by the ATM 50, a network device 52h for accessing a remote host (not shown); a (rear) field engineer display (including control switches in the form of small FDKs) 52i, and a controller device 52j (in the form of a PC core) for controlling the operation of the ATM 50, including the operation of the other devices 52.

The controller 52j comprises one or more microprocessors (CPU) 54 coupled to a controller hub 56 comprising a graphics and memory controller hub (GMCH) and an input/output controller hub (ICH).

The controller hub 56 is coupled to main memory 60, and to a display controller 62, in the form of a graphics card, which is coupled to the displays 52c,i.

The controller hub 56 provides ports, bridges, and interfaces for various input/output devices. The controller hub 56 provides a USB interface 64 to which many of the devices 52 are coupled, and which has a plurality of USB ports 66 to which additional USB devices (such as a removable USB storage device) can be coupled.

The controller hub 56 also provides an interface 68 to a CD-ROM drive and/or a DVD drive.

The controller hub 56 also includes a disk interface to which a disk drive 80 is coupled.

Initialization of the ATM

When the ATM 50 is booted up, the microprocessor 54 loads a BIOS 90 into main memory 60. The microprocessor 54 then accesses the disk drive 80 and loads the main memory 60 with software components, as will now be described.

Operating System

The microprocessor 54 loads an operating system kernel 92 into the main memory 60. In this embodiment, the operating system is a Windows XP (trade mark) operating system, available from Microsoft Corporation (trade mark). When loading the operating system 92, the microprocessor 54 loads the file system 10, including the custom mini filter driver 20a.

Run-Time Platform

The microprocessor 54 also loads a run-time platform 94 into the main memory 60. In this embodiment, the runtime platform 94 is a set of APTRA (trade mark) XFS components, available from NCR Corporation, 1700 S. Patterson Blvd., Dayton, Ohio 45479, U.S.A. The run-time platform 94 provides a range of programming facilities specific to self-service terminal devices and services.

One function of the run-time platform 94 is to enhance the operating system 92 so that the operating system and run-time platform 94 together provide high level access to all of the devices 52, including both standard computing devices (via the operating system 92), and non-standard computing devices (via the run-time platform 94). Thus, the combination of the run-time platform 94 and the operating system 92 can be viewed as providing a complete ATM operating system.

Control Application

The microprocessor 54 also loads a control application (CA) 96 into the main memory 60. For clarity, and to aid understanding, the CA 96 is represented in FIG. 2 as comprising two logical components: a transaction processing component 96a and a management component 96b (referred to as the system application). The CA 96 contains additional components, but these are not relevant to this embodiment so are not described herein.

The transaction processing component 96a provides transaction processing is functions for customers of the ATM 50 to allow these customers to execute transactions at the ATM 50. These transaction processing functions include providing a sequence of screens on the customer display 52c of the ATM 50 to guide a customer through a transaction, as well as controlling the devices 52.

The system application 96b provides device management functions to allow maintenance personnel to diagnose, maintain, and repair devices 52 in the ATM 50.

An authorized user can use the system application 96b to access restricted information stored on a removable storage device, such as a DVD, as will now be described with reference to FIG. 3, which is a flowchart illustrating steps involved in registering a client with the custom mini filter driver 20a.

The first step in the system application registration process 100 is for the system application 96b to authorize a user (step 102). To be authorized, a user must insert an access token, in the form of a USB memory stick (effectively a dongle), into one of the USB ports 66. The USB memory stick must be valid for that ATM 50 and have an unexpired license. Furthermore, the user must enter a passcode to login. If a user is not authorized, then he/she is only given access to the unrestricted functions, not the restricted functions. One of the restricted functions is access to a registration component 98.

Once a user has been authorized, the system application 96b uses the registration component 98 to send a registration request to the client authentication component 34 in the custom mini filter 20a (step 104). The format of the request may be very simple. For example, the registration request may include a specific code (or codes) that is required for all registration requests and an identifier indicating the client (that is, the system application 96b) that is requesting registration. On receipt of this registration request, the custom mini filter driver 20a adds the identifier to the approved client list 28. The custom mini filter driver 20a then uses the client authentication component 34 to respond to the system application 96b with an acknowledgement of approval. This acknowledgement is received by the registration component 98 of the system application 96b (step 106).

Registration of the mini filter driver 20a with the file system filter manager 18 will now be described with reference to FIG. 4, which is a flowchart illustrating the steps involved in the custom mini filter driver registration process 116.

Initially, the custom mini filter driver 20a sends a message (step 118) to the file system filter manager 18 informing the manager 18 that the custom mini filter driver 20a wants to be notified of all removable storage devices currently coupled to the file system 10, and any removable storage device subsequently coupled to or decoupled from the file system 10.

The custom mini filter driver 20a then awaits a message from the file system filter manager 18 indicating that a new volume has been detected (step 120).

When a user (authorized or unauthorized) enters a CD-ROM or DVD into the CD/DVD interface 68 then the file system filter manager 18 will detect this (step 122). The file system filter manager 18 will inform the custom mini filter driver 20a that a volume has been received and will provide the mini filter driver 20a with an identifier for the newly-added volume.

The custom mini filter driver 20a can then ascertain: (i) a volume type (for example, removable media DVD), and (ii) a volume label read from the removable storage device (for example, "NCR_253_IP" read from the DVD) (step 124) to decide if the storage device (that is, the inserted DVD) is of interest to the mini filter driver 20a.

If the newly-added volume is not a removable storage device (step 126), then the custom mini filter driver 20a ignores the volume (step 128). This is ascertained by examining the volume type. If the volume type is a magnetic disk drive then it is not a removable storage device (as the phrase is used herein); however, if the volume type is a CD, DVD, USB storage device, or the like, then the inserted drive is a removable storage device.

If the published message does relate to a removable storage device (step 126), then the custom mini filter driver 20a ascertains if the removable storage device is of interest to the custom mini filter driver 20a (step 130). This is implemented by the custom mini filter driver 20a comparing the volume label with volume labels of interest that have been stored in the VLI list 30 in the custom mini filter driver 20a.

If the published volume label does not match a volume label from the VLI list 30, then the custom mini filter driver 20a ignores the published message (step 128).

If the published volume label does match a volume label from the VLI list 30, then the custom mini filter driver 20a registers its interest in that removable storage device with the file system filter manager 18 (step 132). This involves the FSFM registry 26 updating its list to include that published volume label.

Whenever the file system filter manager 18 receives a request (such as a read or write request) relating to that volume label (that is, the volume label registered with the FSFM registry 26), then the file system filter manager 18 routes the request to the custom mini filter driver 20a. The custom mini filter driver 20a then communicates directly with the file system drivers 16 to fulfill the request.

Any requests for other volume labels (that is, volume labels not on the VLI list 30) are transferred by the file system filter manager 18 directly to the file system drivers 16; that is, they are not routed to the custom mini filter driver 20a. This provides a mechanism by which the custom mini filter driver 20a can indicate the particular storage devices that the custom mini filter driver 20a operates on.

Figure 5:
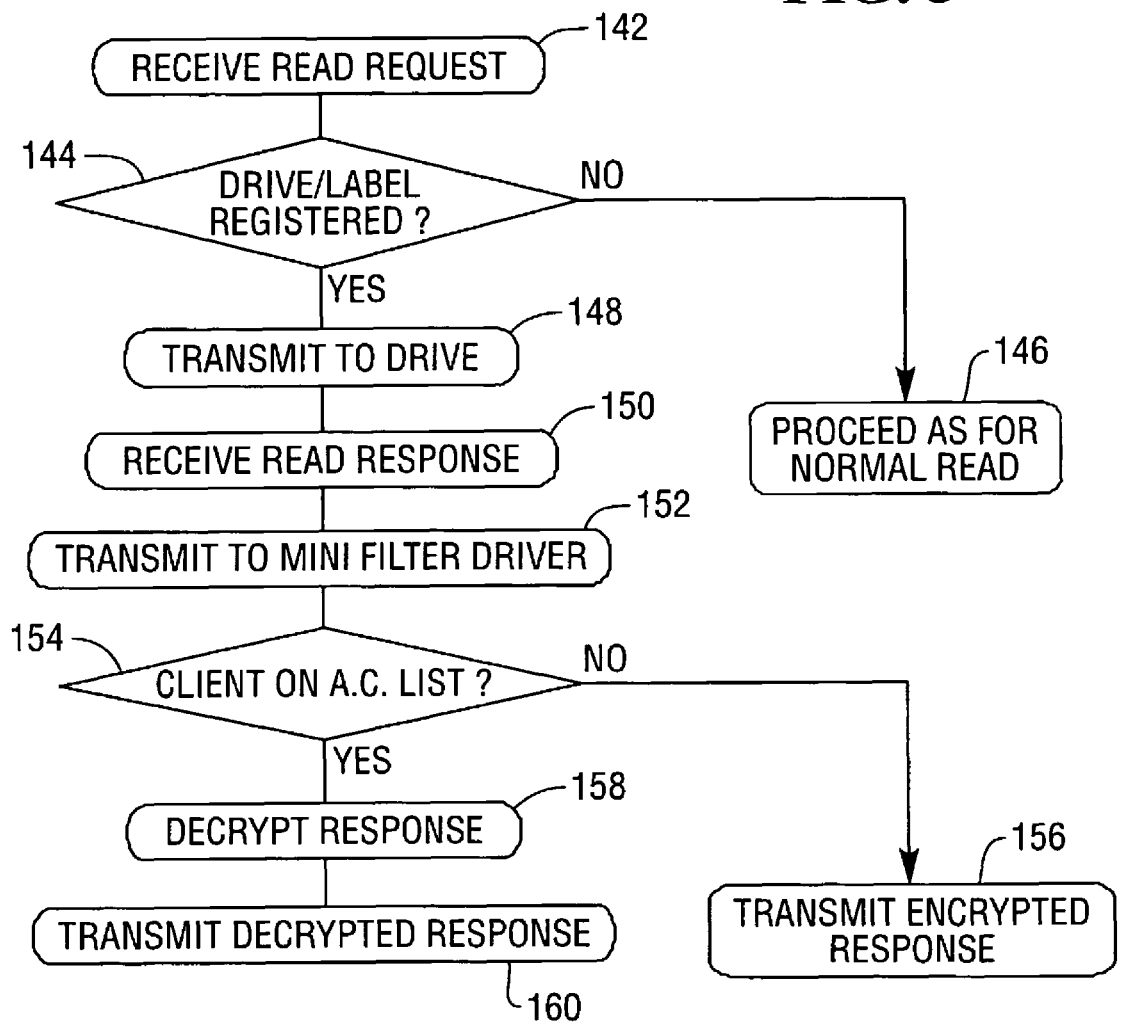
FIG. 5 is a flowchart illustrating steps implemented by the file system of FIG. 1 when reading encrypted information from a removable storage device for a registered client.

The operation of the file system 10 will now be described with reference to FIG. 5, which is a flowchart illustrating the file system reading process 140.

A client (which may be any program executing on the processor 54) sends a read request to read information from a storage device in the ATM 50. This request is received by the file system filter manager 18 (step 142).

The file system filter manager 18 then examines the FSFM registry 26 to ascertain if the custom mini filter driver 20a has registered the storage device and volume label combination as being of interest (step 144).

If the storage device and volume label combination is not listed on the FSFM registry 26 then the file system filter manager 18 proceeds as for a normal read operation (step 146). For example, if the transaction processing component 96a is attempting to read information from the hard drive 80 then this will proceed as for a normal read operation without involving the custom mini filter driver 20a.

However, if the storage device and volume label combination is listed on the FSFM registry 26 then a different process occurs. For example, a field engineer at the ATM 50 may use the system application 96b to attempt to read an inserted DVD having a volume label that has been registered with the FSFM registry 26. When this occurs, the FSFM 18 provides the custom mini filter driver 20a with the opportunity of performing a pre-read operation, which is not illustrated in FIG. 5 because it is not used in this embodiment. A pre-read operation involves the custom mini filter driver 20a operating on a read request prior to data being read from the DVD.

Since the pre-read operation is not used, the next step is for the file system filter manager 18 to percolate the read request down to the physical storage device driver 14 (step 148).

The requested encrypted file is then read from the DVD and transmitted to the FSFM 18 (step 150), which transfers the encrypted file to the custom mini filter driver 20a (step 152).

The custom mini filter driver 20a performs a post read operation on the transmitted encrypted file, which involves ascertaining if the identifier for the client initiating the read request is on the approved client list 28 (step 154).

If the client is not on the approved client list 28, then the custom mini filter driver 20a transmits the encrypted response to that client (step 156). This encrypted information would be meaningless to the client. For example, if a field engineer attempts to read the DVD directly from a file manager application of the operating system then the files could not be read properly because they would be encrypted.

However, if the client (the system application 96b in this example) is on the approved client list 28, then the custom mini filter driver 20a decrypts the encrypted response (step 158) using a decryption algorithm and keys stored within the decryption technology 32.

Once decrypted, the custom mini filter driver 20a transmits the (clear text) information to the requesting client (the system application 96b in this example) (step 160) via the FSFM 18, thereby enabling the requesting client to use the read information.

In this example, the read information may be document files that can be rendered by a document viewer, media files that can be rendered by a media player, or the like.

An authorized user (that is, a user who has logged in to the system application 96b, with a valid, unexpired, access token) may be able to use a menu option displayed on the rear display 52i to request a file to be read from the inserted DVD, and may then be able to execute the appropriate viewer or player within the context of the system application 96b to view or play that file.

In this embodiment, prior to being able to render these files, an approved client (such as the system application 96b) must access the clear text information and then either pass the clear text information to the appropriate viewer or player, or execute the appropriate viewer or player within the context of the system application 96b. If a viewer or player attempts to access the information directly, then only encrypted information will be read from the DVD because the viewer or player is not on the approved client list 28.

It should now be appreciated that this embodiment has the advantage of restricting access to the clear text equivalent of information stored in encrypted form on a removable storage device to client programs approved for accessing such clear text information.

This embodiment allows any type of cryptographic technology to be used on any form of data files. This embodiment also allows standard industry file systems to be used on a removable storage device so that the removable storage device can be read in any conventional computer system.

This embodiment ensures that authorized program(s) on a remote system can decrypt encrypted files on the removable storage device. Unauthorized programs can read the files on the removable storage device but they are not decrypted. If the removable media is taken to any other remote system that does not contain an authorized program then the files may be read but cannot be decrypted.

This embodiment also has the advantage that only the custom mini filter driver contains the decryption technology, not each approved client. A mini filter driver can supply data read from several files on behalf of a number of programs (clients) almost at the same time; the file data read being specific to the client requesting the file reading operation, so that different clients requesting the same file can receive a different response.

A mini-filter driver is not specific to any removable storage device but is file system based, so one mini filter driver can be used to handle the decryption of several removable media types, for example, CD-ROM, DVD, SD card, and the like.

The programs reading the files have no knowledge of whether or not a file is in fact encrypted, and therefore no knowledge of the encryption technologies being used.

The mini filter driver can support a number of authorized clients (programs) at the same time, in addition to many unauthorized clients. For authorized clients the mini filter driver decrypts the encrypted data "on-the-fly" and passes it to the reading process; for unauthorized clients the mini filter driver passes the encrypted (and therefore unreadable) data to the unauthorized client.

This embodiment does not require any modifications to hardware for the decryption to be implemented. The removable storage devices may be copied repeatedly, each copy being readable by an approved client.

Various modifications may be made to the above described embodiment within the scope of the invention, for example, in other embodiments a different operating system to that described may be used.

In other embodiments, the custom mini filter driver may include encryption technology to allow data to be written to the removable storage device in encrypted form.

In other embodiments, the decryption technology may not be stored within the custom mini filter driver, but the custom mini filter driver may access decryption technology stored elsewhere. For example, the decryption technology may be stored on the removable media being read, either on the file being read or on another file. Where the file being read includes decryption technology, then the decryption technology may be stored as a block or may be interleaved within the file. In embodiments where the file being read includes decryption technology, the custom mini filter driver may not convey the entire encrypted file to unapproved clients; instead, the custom mini filter driver may remove any decryption technology from the file and only convey a portion of the file that does not include some or any of the decryption technology. The custom mini filter driver may report a file as having a smaller size than it actually has, so that the reported size corresponds to the file size when some or all of the decrypted technology has been removed from the file.

In the above embodiment, all files on the removable storage device are encrypted. In other embodiments, only some files on a removable storage device may be encrypted. Each encrypted file may include a header, or some other predefined block, indicating whether that file is encrypted or not, so that the custom mini filter driver only decrypts files with a header, or block, indicating that the file is encrypted.

In some embodiments, different encryption techniques may be used on different files on the same removable storage device. In such embodiments, each file may include a header, or some other block, indicating the type of encryption used, and optionally the decryption technology required to decrypt that file. Alternatively, the custom mini filter driver may include multiple decryption technology components, one for each type of encryption technology that may be used.

In other embodiments, the registration request may be very complex.

In other embodiments, the custom mini filter driver may intercept all read accesses to removable storage devices (or even to any storage device, removable or non-removable). In such embodiments, a volume labels of interest list would not be required.

In other embodiments the removable storage device may be a USB device, a memory stick, an SD card, a CD-ROM, or the like.

For non-Windows-based operating systems, a similar scheme could be implemented.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A method of using a mini filter driver which is part of a file system manager in a self-service terminal to secure access to encrypted information stored on a removable storage device inserted in a port terminal to the self-service terminal by an authorized client, the method comprising:
   registering the mini filter driver with the file system filter manager, wherein the mini filter driver is stored in kernel mode, and comprises a list of authorized clients and decryption technology;
   receiving by the mini filter driver a request to read information from the removable storage device;
   ascertaining by the mini filter driver if the request originates from an authorized client on the list of authorized clients;
   receiving encrypted information read from the removable storage device;
   decrypting the encrypted information read by the file manager by the mini filter driver in response to a request originated from an authorized client on said list, wherein the authorized client request makes the request via a management application registered with the mini filter driver as an authorized application; and
   conveying the decrypted information to the authorized client.

2. A method according to claim 1, wherein the request to read information from the removable storage device is relayed via a file system filter manager with which the mini filter driver is registered.

3. A method according to claim 1, wherein ascertaining if the request originates from an authorized client further comprises:
   requiring a client to send a registration request to the mini filter driver prior to that client sending a request to read information from the removable storage device;
   validating the registration request by the mini filter driver;
   sending an acknowledgement to that client; and
   creating an entry for that client in an authorized client list in the mini filter driver.

4. A method according to claim 1, wherein decrypting the encrypted information in the event that the request originated from an authorized client further comprises using decryption technology stored within the mini filter driver to decrypt the encrypted information.

5. A method according to claim 1, wherein decrypting the encrypted information in the event that the request originated from an authorized client further comprises using decryption technology stored on the removable storage device to decrypt the encrypted information.

6. A method according to claim 5, wherein the method may further comprises removing any portions of the encrypted information that contain the decryption technology prior to sending the encrypted information to an unauthorized client.

7. A method according to claim 1, wherein the method comprises the further step of: conveying the encrypted information to an unauthorized client in the event that the request originated therefrom.

8. A computer memory storing in kernel mode the mini filter driver implementing the steps of claim 1.

9. A file management system to recognize a removable storage device presented to provide maintenance to a self-service terminal, where the removable storage device contains encrypted information relating to maintaining the self-service terminal, the file management system implemented as software stored in a non-transitory computer readable medium, the file management system comprising:
   a storage device driver for reading information from and writing information to a removable storage device in conjunction with a physical device driver;
   a file system driver in communication with the storage device driver for organizing files stored on the removable storage device;
   a file system filter manager in communication with the file system driver; and
   a mini filter driver registered with the file system filter manager, wherein the mini filter driver is stored in kernel mode, the mini filter driver further comprising:
      a list of authorized clients to provide maintenance and decryption technology, and
      whereby the mini filter driver decrypts the encrypted information read by the file system driver in response to a request from the authorized client,
      wherein the authorized client makes the request via the management application.

10. A file management system according to claim 9, wherein the mini filter driver further comprises a volume labels of interest list storing volume labels of removable storage devices known to include encrypted information.

11. A file management system according to claim 9, wherein the mini filter driver further comprises a client authentication component for receiving a code and an identifier from a client.

12. A self-service terminal including a plurality of devices requiring periodic maintenance, the terminal comprising:
- a file system filter manager including a file system driver;
- a management application, registered with a mini filter driver as an authorized application, for providing restricted functions accessible only by an authorized client;
- a port internal to the self-service terminal for receiving a removable storage device from the authorized client providing maintenance to the self-service terminal, where the removable storage device contains encrypted information relating to maintaining the devices; and
- the mini filter driver registered with the file system filter manager, wherein the mini filter driver is stored in kernel mode, the mini filter driver comprising:
    - a list of authorized clients and decryption technology, and
    - whereby the mini filter driver decrypts the encrypted information read by the file system driver in response to a request from the authorized client,
    - wherein the authorized client makes the request via the management application.

13. A terminal according to claim 12, wherein the self-service terminal includes a cash dispenser.

14. A terminal according to claim 12 further comprising:
- a controller hub providing a USB interface to a plurality of USB ports.

15. A terminal according to claim 12 further comprising:
- a controller hub providing an interface to a CD-ROM drive or a DVD drive.

16. A terminal according to claim 12 further comprising:
- a controller hub providing a disk interface to a disk drive.

17. A terminal according to claim 12 wherein the port comprises a USB port and the authorized user is recognized by detecting:
- insertion of an access token embodied as a USB memory stick into the USB port; and
- entry of a passcode.

18. A terminal according to claim 17 wherein the mini filter driver informs the file system manager the mini filter driver should be notified of all removable storage devices upon coupling of said removable storage devices to the file system, and upon detection of entry of a CD-ROM or DVD by the file system manager, the file system manager informs the mini filter driver.

19. A terminal according to claim 17 wherein upon recognition of an authorized user, a menu option is enabled and displayed on a rear service display.

20. A terminal according to claim 15 wherein the mini filter driver decrypts encrypted file information read from the CD-ROM drive or the DVD drive.

* * * * *